(12) United States Patent
Fu

(10) Patent No.: US 6,594,945 B1
(45) Date of Patent: Jul. 22, 2003

(54) COCKROACH TRAP

(76) Inventor: Mu-Chung Fu, 4F, No. 103, Lane 367, Sec. 2, Chung Hua Rd., Chung Li City, Tao Yuan Hsien (TW)

( * ) Notice: Subject to any disclaimer, the term of this patent is extended or adjusted under 35 U.S.C. 154(b) by 0 days.

(21) Appl. No.: 10/073,242

(22) Filed: Feb. 13, 2002

(51) Int. Cl.[7] ................................................ A01M 1/22
(52) U.S. Cl. ...................................................... 43/112
(58) Field of Search ............................. 43/98, 112, 120

(56) References Cited

U.S. PATENT DOCUMENTS

| | | | | |
|---|---|---|---|---|
| 1,422,287 A | * | 7/1922 | Marchand | 43/112 |
| 2,558,080 A | * | 6/1951 | Gardenhour | 43/112 |
| 4,709,502 A | * | 12/1987 | Bierman | 43/112 |
| 5,280,684 A | * | 1/1994 | Filonczuk | 43/120 |
| 5,878,526 A | * | 3/1999 | Brigalia et al. | 43/112 |
| 6,009,662 A | * | 1/2000 | Chang | 43/112 |

* cited by examiner

*Primary Examiner*—Kurt Rowan
(74) *Attorney, Agent, or Firm*—Rabin & Berdo, P.C.

(57) ABSTRACT

A cockroach trap includes an open-topped base and a cover pivotally connected to the base. The base is provided on sidewalls with a plurality of entrances closed with inward openable one-way trapdoors, and on a bottom with a bait compartment and two multipolar metal conductors that provide alternately arranged positive and negative poles. The cover is provided on a top with an AC/DC control circuit, an output of which is connected to the two metal conductors. A periodic/manual discharge selector switch is provided on the control circuit for selecting a discharge manner of the two metal conductors to kill any cockroach trapped in the base at minimized power consumption.

6 Claims, 4 Drawing Sheets

COCKROACH TRAP

BACKGROUND OF THE INVENTION

The present invention relates to a cockroach trap, and more particularly to a cockroach trap having one-way trapdoors that can be pushed inward but not outward and a selector switch for controlling the trap to discharge periodically at preset time intervals or manually at selected times to kill any trapped cockroach with electric currents.

The cockroach is one of many insects that have been living on the earth for a very long time. The cockroach has life, reproductivity, and environmental adaptability that are too strong to be imagined by human. The cockroach has ugly appearance that makes people sick, and disgusting nature that makes people impossible to accept it. The cockroach appears in our living environments at any place and at any time to contaminate food and articles and to subject people to threats of bacteria and viruses. The cockroach is just a nightmare for most people.

There are various chemical insecticides developed and commercially available for fighting against cockroaches. However, the existing insecticides tend to pollute food and articles and endanger human when they are sprayed to kill the cockroaches. What is worse is the cockroaches develop good resistance to the insecticides when the latter are applied over a long time. Therefore, chemical insecticides are gradually abandoned and replaced with the so-called cockroach-capturing devices. A very common cockroach-capturing device includes a sticking paper to which a cockroach is stuck and captured. However, the sticking paper tends to lose its sticking ability and even become useless after being exposed to the air for a prolonged time. Thus, the conventional cockroach-capturing devices have short service life to increase a user's burden.

The increasingly developed electronic technologies create a wide range of living-related products, including many largely improved electronic cockroach traps. Most conventional electronic cockroach traps are configured to have only one entrance and to discharge either in an automatic and periodical manner or at any time a cockroach is trapped and detected. The only one entrance of the trap admits only limited number of cockroaches into the trap. And, a high-tension electric net inside the trap is either actuated to produce electric shocks when cockroaches creeping into the trap are detected by infrared, light sensor or other similar means or to automatically periodically discharges at preset time intervals. In either form, the conventional cockroach traps consume considerably high power. Moreover, hiss produced during electric shocks would also scare away other cockroaches outside the traps to further reduce the effect of the conventional cockroach traps.

The cockroach usually appears and moves around in dark corners, particularly in the nighttime. The conventional electronic cockroach traps are usually connected to a receptacle via a power cord to obtain an AC current of commercial power. Being limited by the power cord that usually has a fixed length, it is not always possible to position the conventional electronic cockroach traps at any dark corners as desired.

Another disadvantage of the conventional electronic cockroach trap is it is not provided with any interrupt system to protect a user's safety. Accidents resulted in electrically shocked users often occur.

It is therefore tried by the inventor to develop an improved cockroach trap to eliminate drawbacks existing in the conventional electronic cockroach trapping devices.

SUMMARY OF THE INVENTION

A primary object of the present invention is to provide a cockroach trap having a plurality of one-way trapdoors that can be pushed inward but not outward and a selector switch for controlling the trap to discharge automatically and periodically at preset intervals or manually at selected times to kill any trapped cockroach at reduced power consumption.

To achieve the above and other objects, the cockroach trap of the present invention includes an open-topped base and a cover pivotally connected to the base. The base is provided on sidewalls with a plurality of entrances closed with inward openable one-way trapdoors, and on a bottom with a bait compartment and two multipolar metal conductors that provide alternately arranged positive and negative poles.

The cover is provided on a top with an AC/DC control circuit, an output of which is connected to the two metal conductors. A periodic/manual discharge selector switch is provided on the control circuit for selecting a discharge manner of the two metal conductors to kill any cockroach trapped in the base at minimized power consumption.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
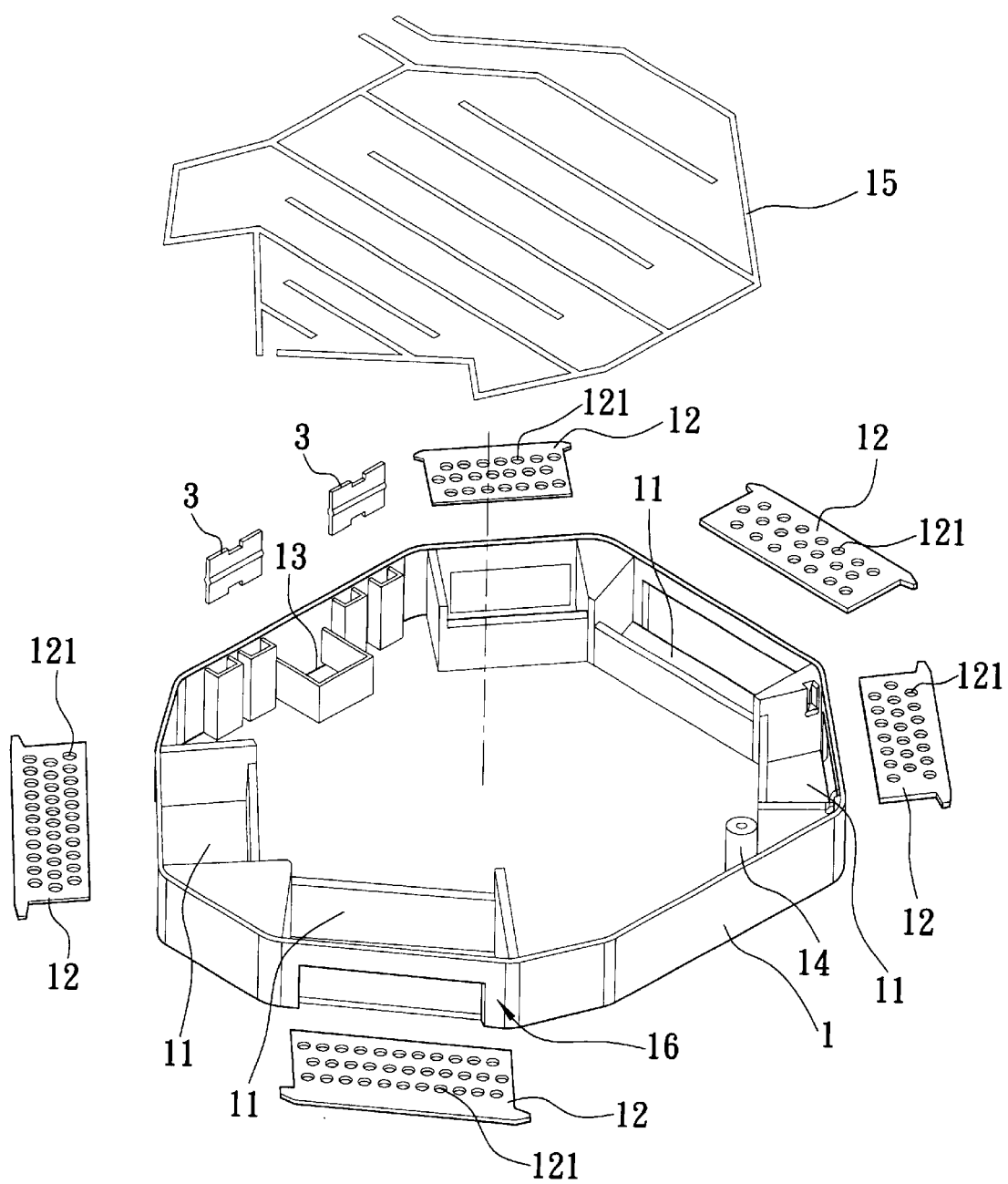
FIG. 1 is an exploded perspective view of a base of a cockroach trap of the present invention.
Figure 2:
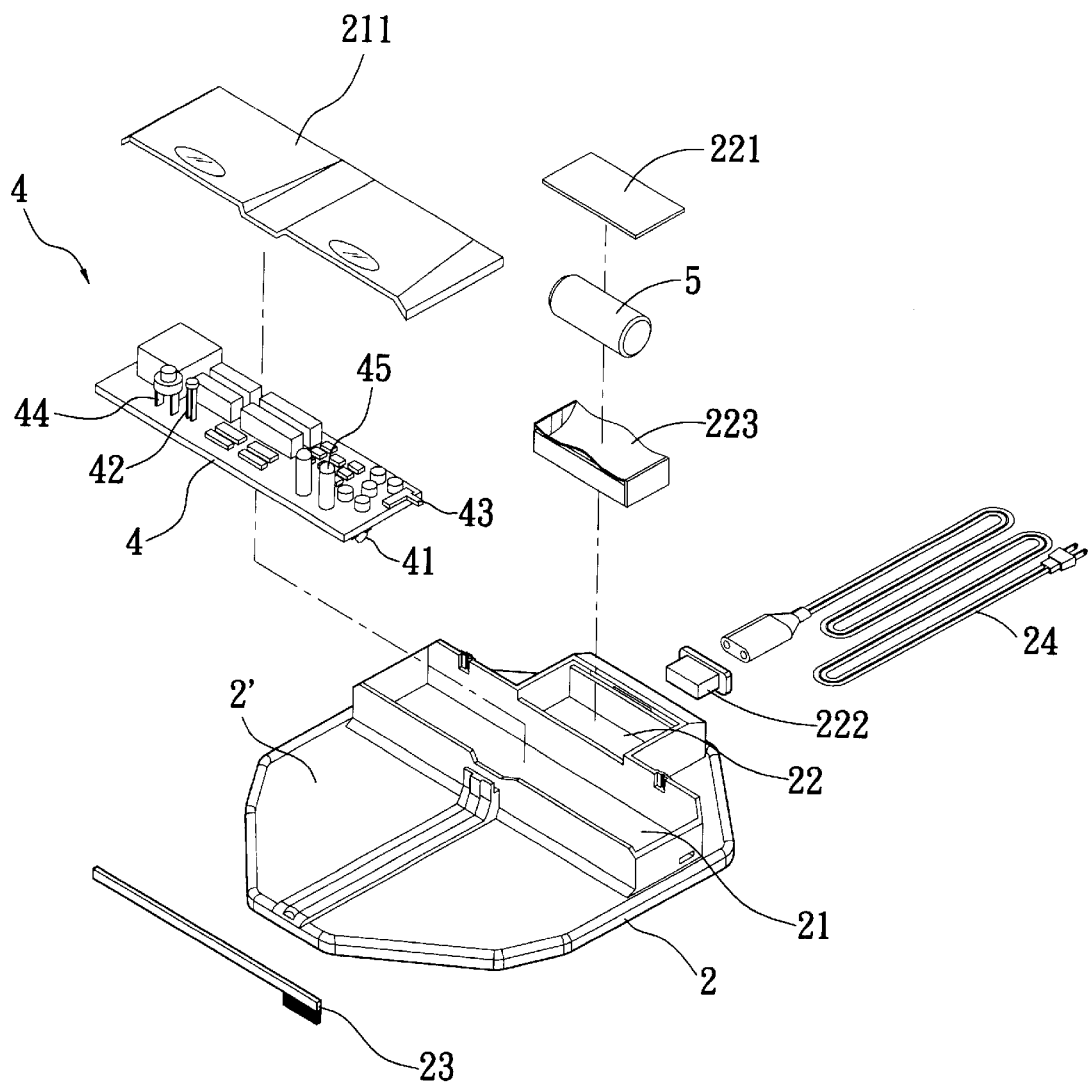
FIG. 2 is an exploded perspective view of a cover of the cockroach trap of the present invention.

Please refer to FIGS. 1 and 2 that are exploded perspective views of a base 1 and a pivotal cover 2, respectively, of a cockroach trap according to the present invention. As shown, the cover 2 is pivotably connected at one side to the base 1 via hinges 3.

The base 1 has a shape of polygonal lozenge and defines an open-topped inner space. A plurality of entrances 11 are spaced on a peripheral side wall 16 of the base 1. Each of the entrances 11 has a one-way trapdoor 12 connected to an upper edge of the entrance 11, such that the trapdoor 12 can only be easily inward pushed open. The trapdoors 12 are light in weight and provided with a plurality of tiny vents 121. A bait compartment 13 and a contact rod 14 are provided inside the base 1 at predetermined positions. And, two multipolar metal conductors 15 are disposed on a bottom of the base 1, so as to provide a plurality of alternately arranged positive and negative poles.

The cover 2 is provided on a top surface 2' with a first compartment 21 for receiving a control circuit board 4 therein, and a second compartment 22 for receiving a battery holder 223 therein. The first and the second compartments 21 and 22 are openably closed with lids 211 and 221, respectively. A cleaning brush 23 may be removably attached to a front side of the first compartment 21, and a socket 222 is provided at a rear side of the second compartment 22 for a power cord 24 to plug thereto to connect the cockroach trap to a commercial power source. A battery 5 is disposed in the battery holder 223 to supply a direct current to the cockroach trap when necessary.

Figure 3:
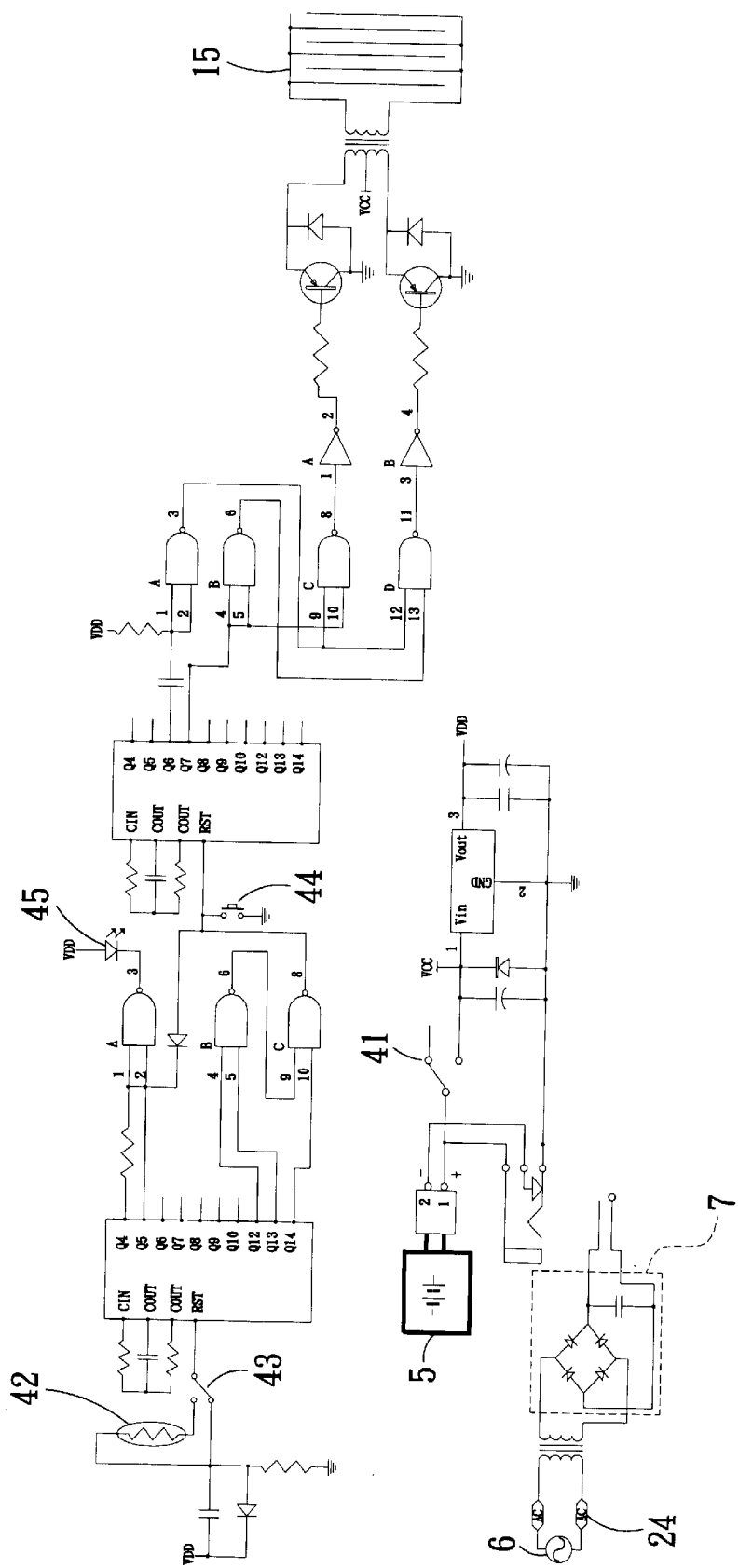
FIG. 3 is a circuit diagram of a control circuit board for the cockroach trap of the present invention.

Please refer to FIG. 3 that is a circuit diagram showing a circuit configuration on the control circuit board 4. On the control circuit board 4, there is provided a rectification circuit, an AC/DC switching circuit 7, a discharge control circuit, and a booster circuit.

The rectification circuit rectifies an alternating current (AC) into a direct current (DC).

The AC/DC switching circuit automatically cuts out the battery 5 when the power cord 24 is connected to a commercial AC power source 6 to obtain an AC current and the rectification circuit rectifies the obtained AC current into a DC current. Or reversely, the AC/DC switching circuit automatically enables the battery 5 to supply a DC current when the power cord 24 is disconnected from the commercial power source 6. A break switch (or normal open switch) 41 is provided on the AC/DC switching circuit to locate at an underside of the control circuit board 4 and downward extend through the cover 2. When the cover 2 is closed onto the base 1, the break switch 41 is in contact with the contact rod 14 in the base 1 to make the circuit. And when the cover 2 is removed from the base 1, the break switch 41 immediately returns to the normal open state to disconnect the circuit. The AC/DC switching circuit may also be provided with a battery charging circuit to charge the battery 5.

The discharge control circuit has a power input connected to an output of the AC/DC switching circuit, and is provided with a light detector 42 for controlling the cockroach trap to discharge periodically at preset intervals and a discharge switch 44 for manually controlling the cockroach trap to discharge at selected times. A selector switch 43 is provided on the control circuit board for a user to switch between the periodical and the manually controlled discharge. A power light 45 is provided to indicate whether the cockroach trap is currently made or not.

The booster circuit is connected to a power output of the discharge control circuit. When the discharge switch 44 is on, the booster circuit immediately boosts the DC current supplied to the cockroach trap to a high-voltage low current and outputs the voltage to the two multipolar metal conductors 15 in the base 1.

Figure 4:
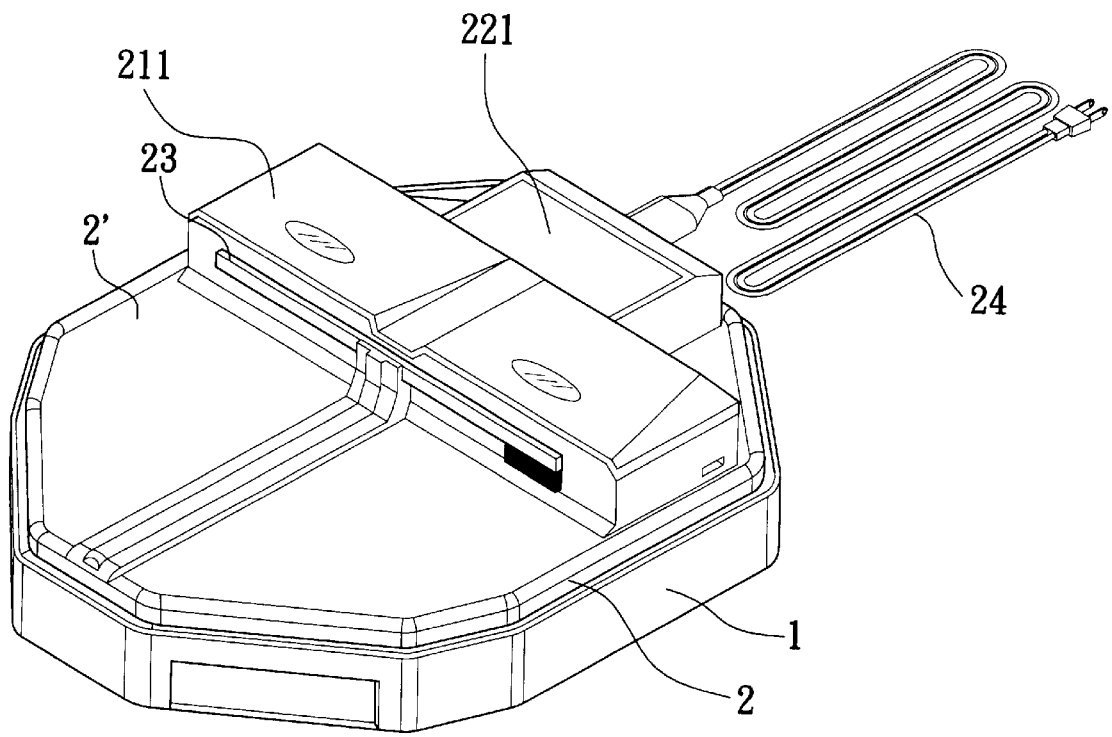
FIG. 4 is an assembled perspective view of the cockroach trap of the present invention.

FIG. 4 is an assembled perspective view of the cockroach trap of the present invention. The cockroach trap of the present invention is particularly designed against the cockroach's nature of creeping along feet and gaps of walls in the dark, and is an AC/DC device that can be powered either by the battery 5 or a commercial power source. The polygonal lozenge-shaped base 1 allows the cockroach trap to be positioned at any dark place of any surface feature with small clearances left between sidewalls of the polygonal base 1 and corners of external walls. In a preferred embodiment of the present invention, the cockroach trap has sidewalls lower than 35 mm and can therefore be positioned deep below a kitchen sink or a bed. The smell of baits positioned in the bait compartment 13 can freely diffuse via the vents 121 on the one-way trapdoors 12 to attract cockroaches. The one-way trapdoors 12 connected to the upper edges of the entrances 11 are light in weight and can be easily pushed inward when the cockroaches creep through the entrances 11 into the base 1. Since the trapdoors 12 are not openable outward, cockroaches are trapped in the closed base 1 once they creep into the cockroach trap of the present invention. When a number of cockroaches are caught in the trap, the selector switch 43 may be operated to either enable the light detector 42 or the manually controlled discharge switch 44. In the case the light detector 42 is enabled, the two metal conductors in the cockroach trap would become made only in the dark or in the nighttime, but not under light or in the daytime, and to periodically discharge at preset intervals to kill the trapped cockroaches with electric currents. And, in the case the light detector 42 is disabled, the two metal conductors 15 would discharge whenever the discharge switch 44 is depressed. In either case, the trapped cockroaches are instantaneously killed by high-voltage currents.

Since the cover 2 is pivotally connected to one side of the base 1 via hinges 3, it can be conveniently lifted for the purpose of removing the dead cockroaches from the base 1. When the cover 2 is lifted, the break switch 41 disengages from the contact rod 14 and thereby automatically cut off all power supplied to the two metal conductors. At this point, a user may take easy to clear the cockroach trap with the cleaning brush 23.

The present invention has been described with a preferred embodiment thereof and it is understood that many changes and modifications in the described embodiment can be carried out without departing from the scope and the spirit of the invention as defined by the appended claims.

What is claimed is:

1. A cockroach trap, comprising a base defining an open-topped space, and a cover pivotally connected to one side of said base with hinges to openably close said open-topped space of said base;

said base being provided along sidewalls thereof with a plurality of spaced entrances, each of which has a one-way trapdoor connected to an upper edge thereof to be opened inward only; a bait compartment being formed in said base, and two multipolar metal conductors being positioned on a bottom of said base in such manner that positive and negative poles are alternately arranged; and said cover being provided on a top surface with a control circuit board that has an input connected to an alternating current (AC) power source and a direct current (DC) power source at the same time, and an output connected to said two metal conductors; and a selector switch being provided on said control circuit board for selecting a manual controlled discharge mode or an automatic periodical discharge mode for said cockroach trap;

said one-way trapdoors allowing cockroaches to creep into but not out of said base via said entrances, and said two metal conductors being adapted to discharge periodically at preset intervals or manually at selected times to kill cockroaches trapped in said base with minimized power consumption through operation of said selector switch.

2. The cockroach trap as claimed in claim 1, wherein said base is in the shape of a polygonal lozenge, and said cover can be lifted relative to said base.

3. The cockroach trap as claimed in claim 1, wherein said cover is provided on the top surface with a first compartment for receiving said control circuit board therein and a second compartment for receiving a battery as said DC power source, and at a rear side of said second compartment with a socket for a power cord to plug thereto to connect said control circuit board to a commercial power source as said AC power source; and wherein said first and said second compartments are openably closed with lids, and a cleaning brush is positioned at a front side of said first compartment.

4. The cockroach trap as claimed in claim 3, wherein said control circuit board includes an AC/DC switching circuit that automatically cuts out said battery when said power cord connects said control circuit board to said commercial power source and an obtained AC current is rectified into a DC current, or automatically enables said battery to supply a DC current when said power cord is disconnected from said commercial power source; said AC/DC switching circuit being provided with a break switch that is located at an underside of said control circuit board to extend downwardly through said cover; said break switch contacting with a contact rod in said base to provide power to said two metal conductors when said cover is closed onto said base, and said break switch immediately returning to a normal open state to disconnect said AC/DC switching circuit when said cover is removed from said base.

5. The cockroach trap as claimed in claim 1, wherein said control circuit board includes a light detector for automatically controlling said two metal conductors to discharge periodically, a discharge switch for manually controlling said two metal conductors to discharge at selected times, a selector switch for a user to switch between said periodical and said manually controlled discharge, and a power light for indicating whether said metal conductors are provided with power or not.

6. The cockroach trap as claimed in claim 1, wherein said trapdoors are light in weight and provided with a plurality of small vents.

* * * * *